United States Patent [19]

Grandmont

[11] 4,373,473
[45] Feb. 15, 1983

[54] HEAT RECUPERATING WATER HEATING SYSTEM

[75] Inventor: Robert Grandmont, Sherbrooke, Canada

[73] Assignee: 110707 Canada Ltee, Quebec, Canada

[21] Appl. No.: 243,764

[22] Filed: Mar. 16, 1981

[51] Int. Cl.³ .............................................. F22B 33/00
[52] U.S. Cl. .................................. 122/20 B; 126/365; 237/1 R
[58] Field of Search ...................... 122/20 B; 237/1 R; 165/DIG. 2; 126/364, 365

[56] References Cited

U.S. PATENT DOCUMENTS

| | | |
|---|---|---|
| 815,274 | 3/1906 | Dixon . |
| 1,107,534 | 8/1914 | Lovekin . |
| 1,865,852 | 7/1932 | Goldhagen . |
| 3,910,236 | 10/1975 | Merritt, Jr. . |
| 4,037,567 | 7/1977 | Torres . |
| 4,043,014 | 8/1977 | Wilson . |
| 4,122,801 | 10/1978 | Burns . |
| 4,175,518 | 11/1979 | Reames . |
| 4,258,878 | 3/1981 | Pachtehbeke ............... 122/20 B X |
| 4,318,367 | 3/1982 | Antonucci ................... 122/20 B |

FOREIGN PATENT DOCUMENTS 2040414  8/1980  United Kingdom ............. 122/20 B

*Primary Examiner*—Edward G. Favors
*Attorney, Agent, or Firm*—Cushman, Darby & Cushman

[57] ABSTRACT

The heat recuperating water heating system includes a water receiving enclosure to which is mounted a burner to provide a source of heat to the water and the products of combustion from this heat source are carried through a flue which is modified to include a manifold equipped with a continuous doubly wound coil defining inner and outer concentric loops, in turn, connected to a pair of conduits; a water circulator is mounted in one of the conduits and is electrically connected to the burner so that each time the burner operates, the circulator is also set in operation and provides a constant determined flow of water in the coil.

8 Claims, 3 Drawing Figures

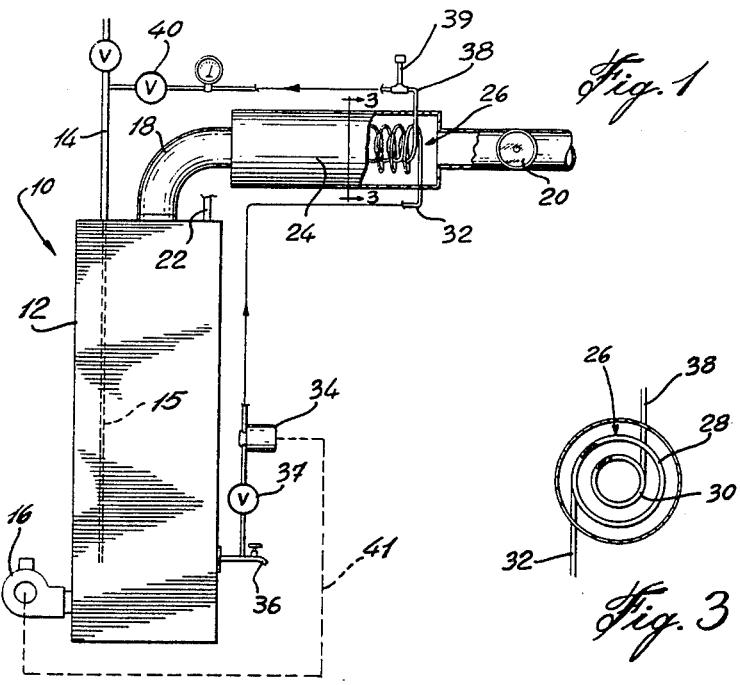
Fig. 1
Fig. 3
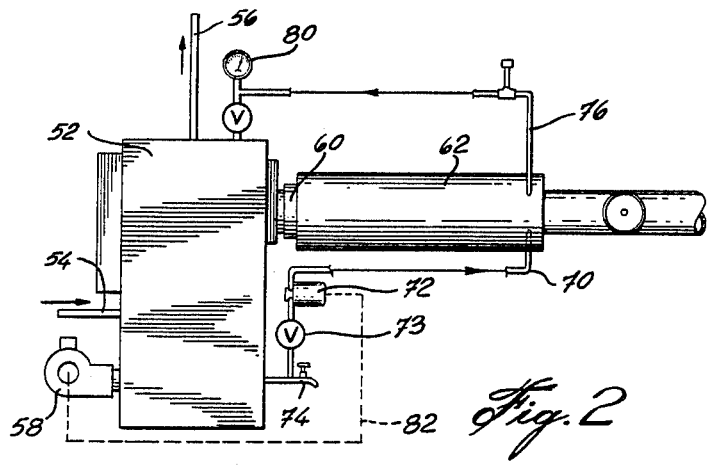
Fig. 2

HEAT RECUPERATING WATER HEATING SYSTEM

FIELD OF THE INVENTION

The present invention relates to a water heating system and, more particularly, to such a system where heat is recuperated from the flue which carries away the products of combustion from the heat source.

BACKGROUND OF THE INVENTION

Recuperating heat from the hot flue gases is not new per se; such systems are found described, for example, in U.S. Pat. Nos. 4,037,567 issued July 26, 1977 to Torres and 4,175,518 issued Nov. 27, 1979 to Reames. In the first of these earlier systems, a recycle loop is provided which extracts heat from waste gases for the heating of a portion of the boiler feed water wherein the water is circulated within the recycle loop without the need to furnish any additional power. In the second of the above patents, a system is provided which, by natural convections, continually recirculates water from the water storage tank through the preheater during periods of times when water is not being drawn off from the hot water heater.

OBJECTS AND STATEMENTS OF THE INVENTION

It is an object of this invention to provide a heat recuperating water circulating system which can be used in either a hot water tank or a boiler, which optimizes the heat recuperation available from the waste gases; this is accomplished by directly associating the operation of a water circulating pump connected to the system, to the operation of the source of heat and by operating the pump at a pre-determined water feed. In this fashion, forced water circulation in the closed water line is permitted only when and each time the burner is operating.

The present invention therefore relates, in its broadest aspect, to a heat recuperating water heating system which comprises: a water receiving enclosure; a water inlet to and a water outlet from said enclosure, a burner to provide a source of heat for heating water in the enclosure; a flue to carry away products of combustion from the heat source; a manifold in the flue; a continuous coil line in the manifold, the coil line being doubly wound to define a pair of inner and outer concentric loops, the coil line having one end connected to a first conduit in communication with the water inlet and the opposite end connected to a second conduit in communication with the water outlet; water circulating means in the second conduit between the opposite end of the coil line and the water outlet; and electrical means connecting the water circulating means to the burner to set the circulating means in operation each time the burner is operated, the water circulating means being set to provide a determined flow of water in the coil.

Other objects and advantages of the present invention will become apparent from the following description of embodiments of the invention; it should be noted, however, that various modifications can be brought to these embodiments without departing from the scope of the appending claims.

BRIEF DESCRIPTION OF THE DRAWINGS

FIG. 1 is a schematic elevational view of a water system made in accordance with the present invention and associated with a hot water tank;

FIG. 2 is a schematic elevational view of a water heating system made in accordance with the present invention and associated with a boiler; and FIG. 3 is a cross-sectional view taken along lines 3—3 of FIG. 1.

DESCRIPTION OF PREFERRED EMBODIMENTS

Referring to FIG. 1, there is shown a heat recuperating water heating system associated with a hot water tank 10, which includes a water receiving enclosure body 12. The construction of the hot water tank is conventional and does not form part of the present invention. A conduit 14 is connected between the hot water tank and a source of water supply (not shown) feeds water to the lower part of the enclosure 12. A burner 16 of conventional construction is mounted to the lower part of the enclosure 12 and provides a source of heat for heating the water fed from the lower part 15 of conduit 14. An exhaust flue 18 is connected to the hot water tank for the purpose of discharging the products of combustion from the source of heat, the usual control vent 20 being provided in the flue exhaust system. A water outlet 22 exits at the top of the tank to bring heated water to various locations of a home or other like buildings. The exhaust flue 18 has an enlarged portion or manifold 24 in which is arranged a continuous coil line 26 which is doubly wound to define a pair of concentrically arranged loops 28 and 30. The outer loop 28 is connected at the downstream end of the manifold 24 to a conduit 32 in communication with the hot tank 12 through a water circulating pump 34 and a drain pipe 36. A check valve 37 is associated also with line 32 between the pump and the drain outlet. The downstream end of the inner loop is connected to the water inlet conduit 14 by means of a conduit 38 equipped with the usual air bleed nipple 39, valve 40, etc., well known in the plumbing art. The operation of the circulating pump 34 is electrically connected to the operation of the burner 16, as represented by dotted lines 41, so that each time the burner operates, the circulating pump is also set in operation.

Referring to FIG. 2, there is shown a heat recuperating system similar to that of FIG. 1, but applied to a boiler generally represented by reference numeral 50. The boiler has a water receiving enclosure 52 with an inlet 54 to receive the returning colder water of the water circuitry of a building and a water outlet 56 to send back heated water to the building. The boiler 50 includes a burner 58 that provides a source of heat for the water to be heated. An exhaust flue 60 has an enlarged portion or manifold 62 in which is lodged a continuous doubly wound coil having inner and outer concentric loops similar to that shown in FIG. 1. The downstream end of the outer concentric loop is connected to the boiler through a conduit 70 in which are incorporated a water circulating pump 72, a valve 73 and a drain 74. The downstream end of the inner concentric loop is connected to the boiler through a conduit 76 in which is mounted a pressure gauge 80. The burner 58 is electrically connected to the circulating pump 72 (as shown by dotted lines 82) so that every time the burner is operated the pump also circulates the water in the coil of the manifold 62.

In both embodiments, the operation of the circulating pumps 34 and 72 is set to permit a given flow of water to the outer concentric loop of the coil. It has been found with standard size of plumbing conduits that, if the circulation pump is set to provide a flow of between 3 gallons per minute to 5 gallons per minute, an increase of up to 50° F. can be detected between the conduit lines 32 and 38 in the case of the hot water tank 10 and in conduits 70,76 in the case of the boiler 50. These results have been obtained with a coil having a total stretch length of 60 feet and doubly wound in a manifold having a length of 30 inches. It has been observed that the efficiency is greatly reduced if the flow of water exceeds five gallons per minute; the water does not remain in the manifold a time sufficient to absorb.

The embodiments of the invention in which an exclusive property or privilege is claimed are defined as follows:

1. A heat recuperating water heating system comprising:
    a water receiving enclosure;
    a water inlet to and a water outlet from said enclosure;
    a burner to provide a source of heat for heating water in said enclosure;
    a flue to carry away products of combustion from said heat source;
    a manifold in said flue;
    a continuous coil line in said manifold, said coil line being doubly wound to define a pair of inner and outer concentric loops; said coil line having one end connected to a first conduit in communication with said water inlet and the opposite end connected to a second conduit in communication with said water outlet;
    water circulating means in said second conduit between said opposite end of said coil line and said water outlet; and
    electrical means connecting said water circulating means to said burner to set said circulating means in operation each time said burner is operated, said water circulating means being set to provide a determined flow of water in said coil.

2. A heat recuperating water heating system as defined in claim 1, wherein said ends of said coil line exit from said manifold at an end remote from said enclosure.

3. A heat recuperating water heating system as defined in claim 2, wherein said one end of said coil line in communication with said water inlet is continuous with said inner concentric loop and wherein said opposite end of said coil line in communication with said water circulating means is continuous with said outer concentric loop.

4. A heat recuperating water heating system as defined in claims 1, 2 or 3 wherein said water circulating means is determined to provide a flow of water in the range of three to five gallons per minute.

5. A heat recuperating water heating system as defined in claims 1, 2 or 3, further comprising first valve means located in said second conduit between said heat circulating means and said water outlet, and second valve means located in said first conduit between said one end of said coil and said water inlet.

6. A heat recuperating heating system as defined in claims 1, 2 or 3, further comprising vent means in said first conduit between said one end of said coil and said water inlet.

7. A heat recuperating water heating system as defined in claim 1, wherein said enclosure is a boiler.

8. A heat recuperating water heating system as defined in claim 1, wherein said enclosure is a water tank and said first conduit is connected to a cold water inlet line to said tank.

* * * * *